United States Patent [19]

Enzmann

[11] 4,441,307
[45] Apr. 10, 1984

[54] HARVESTER HEADER WITH FLOATING CUTTER BAR

[75] Inventor: Michael H. Enzmann, Blue Springs, Mo.

[73] Assignee: Allis-Chalmers Corporation, Milwaukee, Wis.

[21] Appl. No.: 412,953

[22] Filed: Aug. 30, 1983

[51] Int. Cl.³ .............................................. A01D 67/00
[52] U.S. Cl. ................................... 56/208; 56/10.2
[58] Field of Search ................ 56/208, 10.4, 122, 10.2, 56/15.8, DIG. 15, 215, 257, 14.4, 14.5, 15.9, 181

[56] References Cited

U.S. PATENT DOCUMENTS

| 1,881,411 | 10/1932 | Love et al. | 56/181 |
| 2,099,471 | 11/1937 | Edgington | 56/181 |
| 2,760,326 | 8/1956 | Smith | 56/14.5 |
| 3,574,990 | 4/1971 | Calder | 56/208 |
| 3,886,718 | 6/1975 | Talbot | 56/10.2 |
| 3,967,437 | 7/1976 | Mott et al. | 56/208 |
| 3,982,383 | 9/1976 | Mott | 56/208 |
| 4,162,606 | 7/1979 | Weichel | 56/15.9 |
| 4,199,925 | 4/1980 | Quick et al. | 56/208 |
| 4,204,383 | 5/1980 | Milliken | 56/10.2 |
| 4,206,583 | 6/1980 | Week et al. | 56/208 |
| 4,227,363 | 10/1980 | Kerber et al. | 56/208 |
| 4,313,294 | 2/1982 | Martenas | 56/208 |
| 4,332,126 | 6/1982 | Van Anwelare et al. | 56/208 |

FOREIGN PATENT DOCUMENTS 2722883  11/1978  Fed. Rep. of Germany ....... 56/15.9

Primary Examiner—Robert Peshock
Assistant Examiner—John G. Weiss
Attorney, Agent, or Firm—Charles L. Schwab

[57] ABSTRACT

The floating cutter bar (37) of a harvester is mounted on the header by a series of laterally spaced parallel linkages (60). The cutter bar (37) is counterbalanced by the combination of compression springs (104) acting on the lower link (62) of each linkage (60) and overlapping sheet springs (111, 112) which also serve as an access ramp for harvested crop. The front ends of the links (61, 62) of the parallel linkages (60) are connected to the cutter bar skids (41, 43, 45, 47) by ball and socket joints (71, 76 and 72, 77).

4 Claims, 7 Drawing Figures

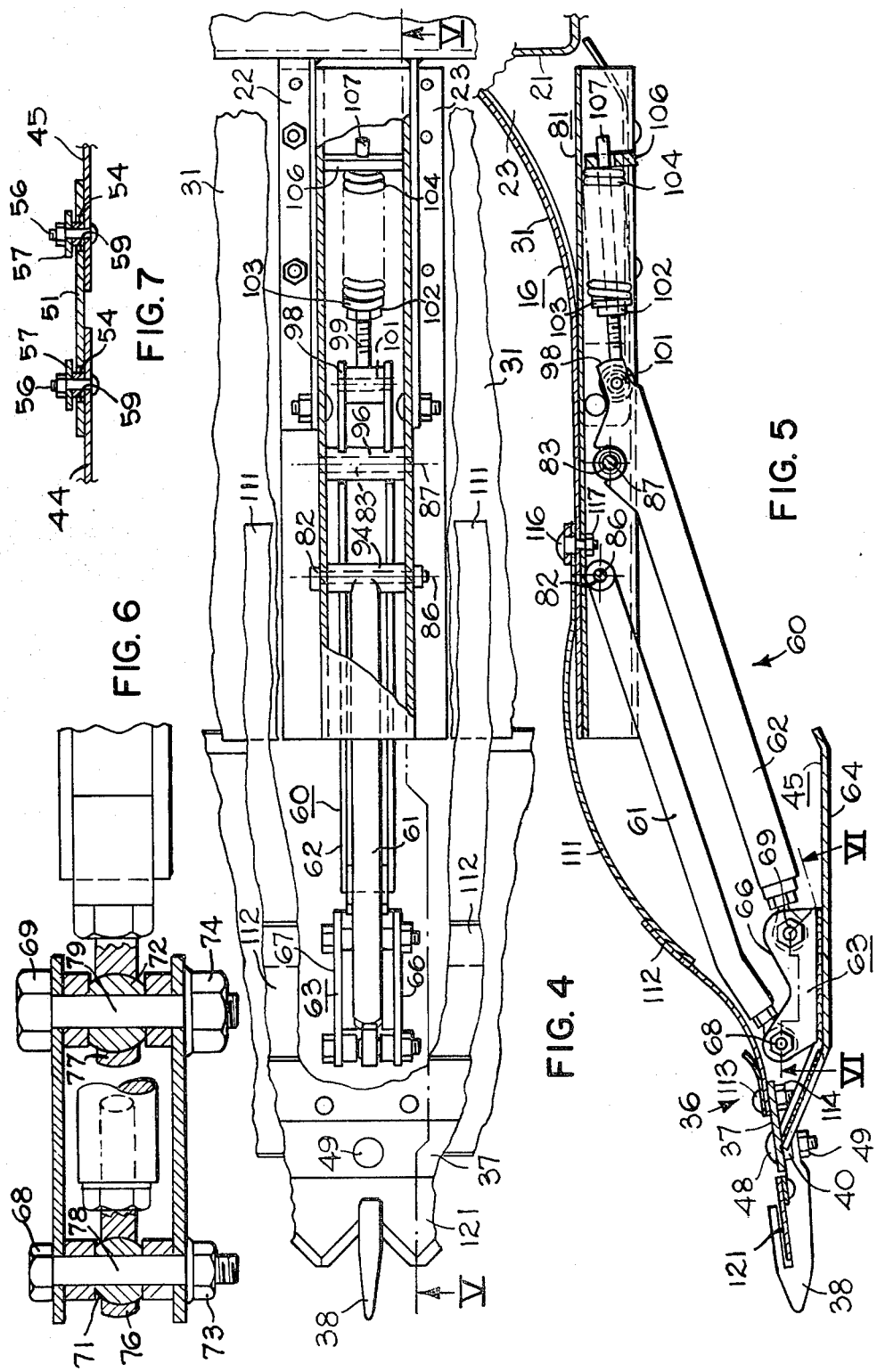

HARVESTER HEADER WITH FLOATING CUTTER BAR

BACKGROUND OF THE INVENTION

1. Technical Field

This invention relates to the header for a harvester and more particularly to the construction and suspension of a floating cutter bar for a harvester header.

2. Prior Art

Heretofore, others have provided floating cutter bars of various types. One such floating cutter bar is illustrated in U.S. Pat. Nos. 4,206,583 and 4,206,584 wherein a floating cutter bar is supported by a plurality of laterally spaced linkages each of which are spring biased by an upstanding compression spring at the rear of the header. Another floating cutter bar construction is shown in the U.S. Pat. No. 3,982,383 wherein a series of quadrilateral linkages are employed to support a floating cutter bar and a sheet spring is employed to partially support it. U.S. Pat. No. 3,574,990 is of interest in that it shows a harvester platform supported by parallel links which are connected at their front and rear ends to the platform and vehicle frame by ball and socket joints.

BRIEF DESCRIPTION OF THE INVENTION

This invention has particular use in a crop harvester header of the type having a transverse rear wall, a pair of standing end walls and a bottom structure extending between the end walls and rearwardly to the rear wall. The invention contemplates use of a flexible floating cutter bar extending transversely along the front of the header bottom structure and a plurality of link supported ground engaging skids secured in supporting relation to the cutter bar at transversely spaced intervals therealong. At least one pair of fore and aft extending parallel links are provided for each of the link supported skids. Means are provided to pivotally connect the rear ends of the links to the bottom structure of the header so that the linkages swing vertically about longitudinally spaced transverse axes and a pair of universal pivot joints connect the front ends of the links to the associated skids which permit the skids to tilt to accommodate flexing of the cutter bar along its length as the skids follow the ground contour during a harvesting operation. Preferably the links of each pair of links are in a one above the other relationship.

The invention may include provision of a lateral stabilizer having a front end pivotally connected to one of the skids by a ball and socket joint and the rear end pivotally connected to the underside of the bottom structure of the header on a transverse axis permitting vertical swinging movement and preventing horizontal swinging movement of the stabilizer and cutter bar. Auxiliary skids may be provided which are not supported by linkages from the header but rather are connected to the cutter bar. Splice brackets may also be used to loosely interconnect laterally adjacent ends of the skids. It may also be desirable to provide stabilizer links at each lateral end of the header which pivotally interconnect the header and the cutter bar on axes spaced above the transverse axes by which the links are connected to the bottom structure and above the pivot joints by which the links are connected to the cutter bar.

A concept of the invention includes the use of first spring means in the form of a compression spring interposed between a lever arm on one of the links of each pair of parallel links and a second spring means in the form of first and second series of sheet springs which are in overlapping thrust transmitting engagement to provide vertical support for the cutter bar. One series of sheet springs are secured to and extend forwardly from the front of the header bottom structure and the other series of sheet springs are secured to the cutter bar and extend rearwardly therefrom to overlap the front portions of the first series of sheet springs.

BRIEF DESCRIPTION OF THE DRAWINGS

One embodiment of the invention is illustrated in the drawings in which:

FIG. 4 is a partial top view of the header with portions broken away for illustration purposes;

FIG. 5 is a view taken along the line V—V in FIG. 4;

FIG. 6 is a view taken along the line VI—VI in FIG. 5; and

FIG. 7 is a view taken along the line VII—VII in FIG. 3.

DETAILED DESCRIPTION OF THE DRAWINGS

Figure 1:
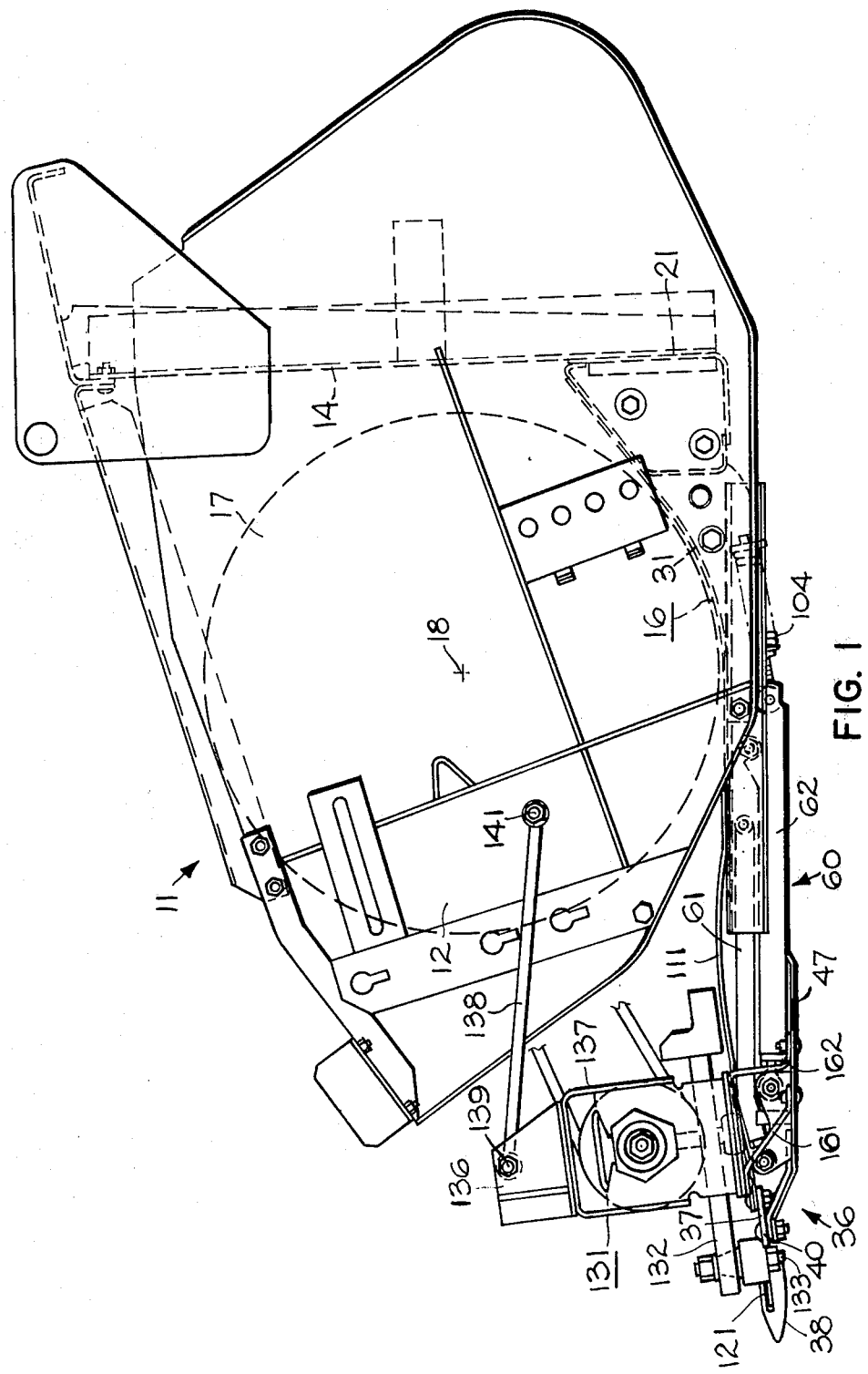
FIG. 1 is a side view of a header for a combine.
Figure 2:
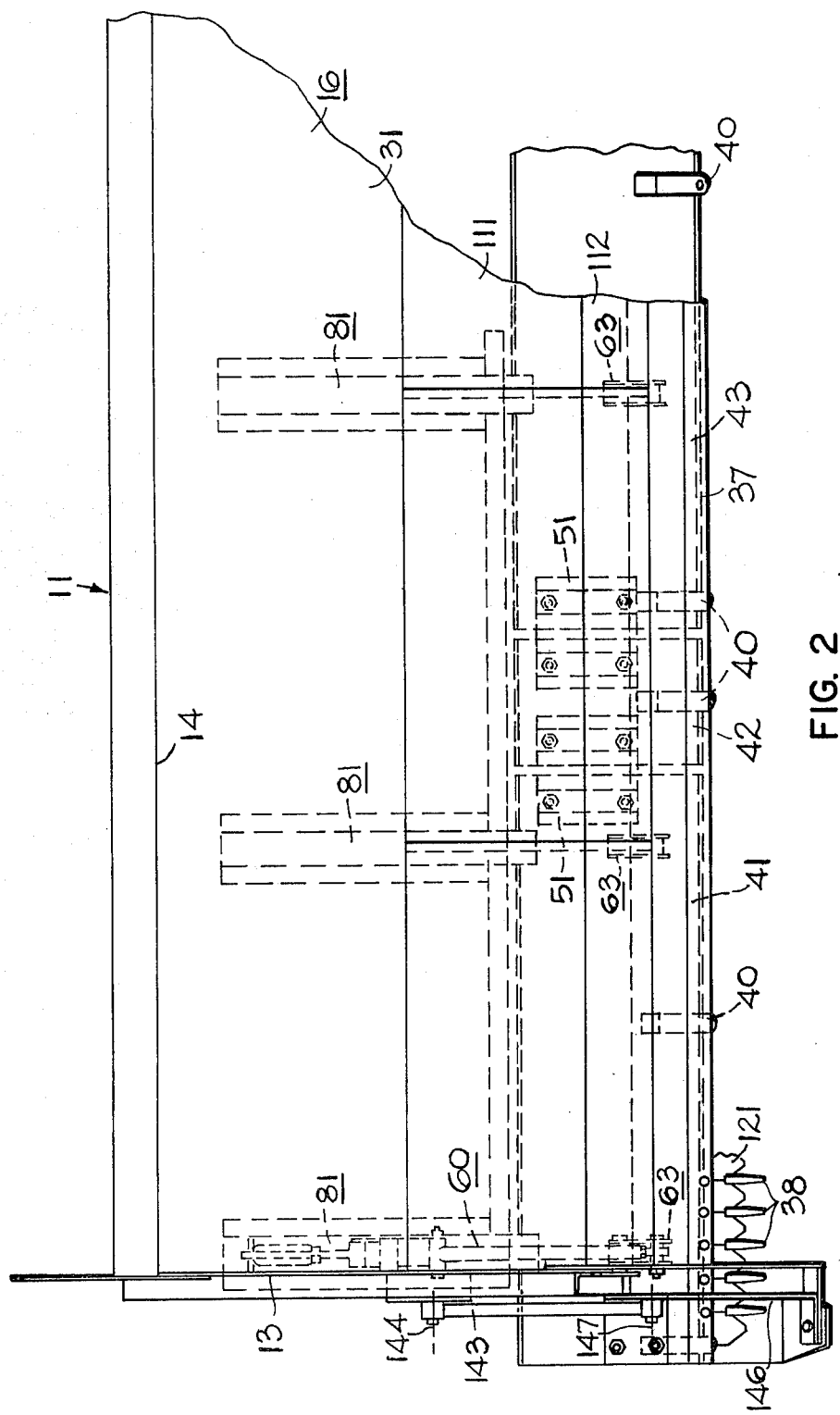
FIG. 2 is a partial top view showing the right-hand side of the header.
Figure 3:
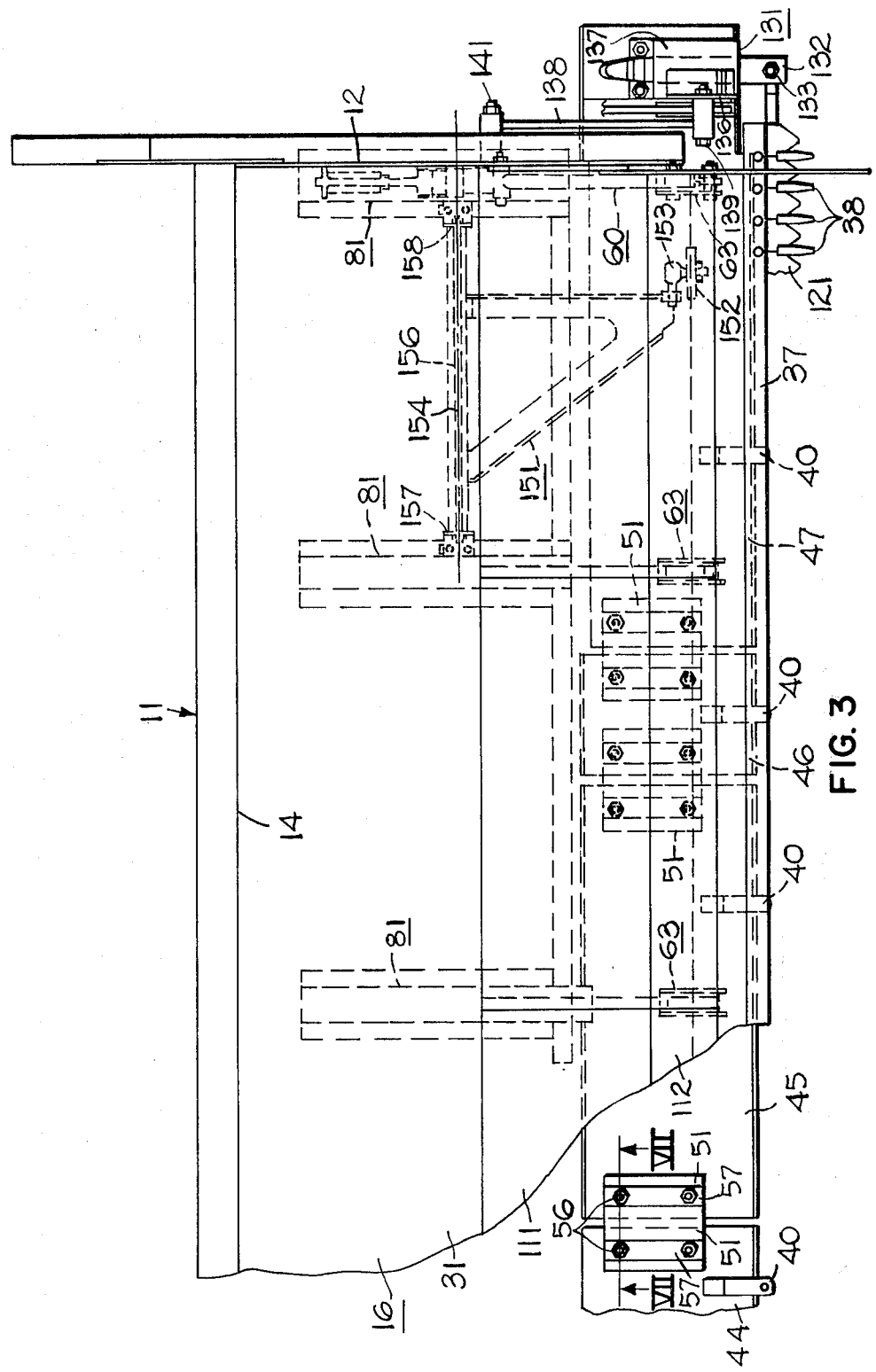
FIG. 3 is a partial top view showing the left-hand side of the header.

Referring to FIGS. 1, 2 and 3, a combine header 11 includes a pair of vertical walls 12 and 13 at the left and right-hand side of the header 11, an upright rear wall 14 and a bottom structure 16. A transversely disposed cylindrical auger 17 is mounted by means not shown on the side walls 12 and 13 for rotation about a transverse pivot axis 18. Referring also to FIG. 4, the bottom structure 16 includes a transverse hollow beam 21 to which a plurality of arms 22 and 23 are welded. The bottom structure 16 also includes a curved, concave bottom wall 31 which extends downwardly and forwardly from the transverse beam 21 as illustrated in FIGS. 4 and 5. A floating cutter bar assembly 36 is mounted on the header 11 and extends along the forward edge thereof between the opposite side walls 12 and 13. The floating cutter bar 36 includes a cutter bar 37 which extends between the opposite side walls 12 and 13 and to which a plurality of guards 38 are attached. The cutter bar 37 is bolted to tabs 40 on a plurality of laterally spaced skids 41, 42, 43, 44, 45, 46 and 47 by bolts 48 and nuts 49. The skids are interconnected by splice brackets 51 interconnecting their adjacent ends. The fastening means for connecting the splice brackets 51 to the skids 41, 42, 43, 44, 45, 46 and 47 as illustrated in FIG. 7 includes spools or spacers 54 through which bolts 56 extend. Retainer straps 57 have a hole through which bolts 56 extend and the skids also include openings through which the bolts 56 extend. The splicer bracket 51 includes openings 59 which are substantially greater in size than the spools 54 thereby permitting considerable movement between the splice brackets 51 and the skids. These loose connections afforded by the splice brackets 51 and fastening means allow relative movement between the skids for traversing uneven ground. Skid plates 41, 43 and 47 are mounted on the header 11 by two pairs of parallel links or linkages 60 which will hereinafter be described. Skid 45 is mounted by a single parallel linkage 60 and auxiliary skids 42 and 47 are secured to the cutter bar 37 by a bolt 48 and nut 49 but are not connected to the header 11 by a parallel linkage.

Referring to FIGS. 4, 5 and 6, one parallel linkage 60 for supporting the cutter bar 37 will be described in detail. The forward ends of parallel links 61 and 62 are pivotally connected to a bracket 63 welded to the upper side of skid plate 64 of skid 45. The bracket 63 includes a pair of upstanding flanges 66 and 67 with aligned openings for receiving bolts 68 and 69 which carry a ball-like or spherically shaped bearings 71 and 72 disposed between suitable spacers through which the bolts 68 and 69 also extend. The bolts 68 and 69 are secured by nuts 73 and 74. The forward ends of the links 61 and 62 have spherically shaped sockets 76 and 77 in load bearing engagement with the spherical surfaces of ball shaped members 71 and 72. These ball and socket joints act as universal joints in providing limited movement about a pair of longitudinally spaced points 78 and 79. The rear ends of the links 61 and 62 are pivotally connected to a channel member 81 by transversely extending pivot pins 82 and 83 which permit the links 61 and 62 to swing about horizontal, transverse pivot axes 86 and 87 spaced from one another in fore and aft direction. The spacing between the axes 86 and 87 is the same spacing as provided between the points 78 and 79. The rear ends of the links 61 and 62 include transverse bushing portions 94 and 96 with radially inner cylindrical bearing surfaces cooperatively engaging the outward facing cylindrical bearing surfaces of pins 82 and 83 and serve to stabilize the links against swing movement in a horizontal plane. The lower link 62 includes a rearwardly extending lever arm 98 the rear end of which is pivotally connected to an eye bolt 99 by a transverse pivot pin 101. The eye bolt 99 carries a nut 102 and a washer 103 and extends rearwardly through a coil compression spring 104 and through an opening in an abutment plate 106 welded to the channel member 81. The rear end 107 of the eye bolt 99 extends through an enlarged opening in the abutment plate 106 so that it is free to move relative thereto as the floating cutter bar raises and lowers. The compression spring 104 is preloaded by adjusting nut 102 to exert a clockwise torque on the arm 62, as viewed in FIG. 5, to partly counterbalance the weight of the floating cutter bar assembly 36. As shown in FIG. 5, the spring 104 is least effective in exerting a moment on lever 62 because the effective lever arm is short; however, as the floating cutter bar assembly 36 swings upwardly the effective lever arm increases and the spring 104 experts a greater counterbalancing torque or moment. A primary spring biased support for the floating cutter bar assembly 36 is provided by cooperating sheet springs 111 and 112. The front of the front sheet spring 112 is secured to the cutter bar 37 by a series of bolts 113 and nuts 114. The rear sheet spring 111 is secured at its rear to the header bottom wall 31 by bolts 116 and nuts 117. The front sheet spring 112 has a rear end portion in overlapping relation to a front end portion of rear sheet spring 111 and these springs are so proportioned that there will always be an overlap regardless of the position of the cutter bar 37 in relation to the header 11. The sheet springs 111 and 112 also serve as a ramp for moving crop material cut by the reciprocating sickle 121 during a crop harvesting operation. The rear and front sheet springs 111 and 112 are provided in segments which extend laterally roughly between the parallel supporting linkages 60. Their adjacent lateral ends are in lapped relation to one another so that seed or grain will not be lost and to accommodate a transverse wave-like form that may be assumed by the floating cutter bar as it traverses uneven terrain. The sheet springs provide greater lift to the floating cutter bar assembly in the latter's lowered position, as shown in FIG. 5, than in the raised position thereof shown in FIG. 1. Thus, when the primary springs 111 and 112 exert the least lift, the secondary springs 104 are providing their greatest lift and vice versa.

Referring to FIGS. 1, 2 and 3, the sickle 121 is driven by a wobble drive 131 whose output member or lever 132 is connected to the end of the sickle 121 by an upstanding pivot bolt 133. The wobble drive housing 137 is bolted to brackets 161, 162 which in turn are bolted to skid 47. A bracket 136 rigidly secured to the top of the wobble drive housing 137 is interconnected to the side wall 12 by a link 138 whose front end is pivotally connected to the bracket 136 by a transverse pivot pin 139 and whose rear end is pivotally connected to the side wall 12 by a transverse pivot pin 141. The link 138 serves as a stabilizer link and prevents the parallel linkage from locking up when the floating cutter bar 37 is in its extreme raised position. As shown in FIG. 2, a similar stabilizer link 143 is provided on the right side of the header 11 with its rear end connected to the header end wall 13 on a transverse axis 144 and with its front end pivotally connected on a transverse axis 147 to an upstanding bracket 146 secured to the skid 41. The cutter bar assembly 36 is stabilized against lateral shifting movement relative to the header 11 by a lateral stabilizer 151 whose front end is pivotally connected to an upstanding bracket 152 on the skid 47 by a ball and socket joint 153. The rear end of the lateral stabilizer 151 is pivotally connected on a transverse axis 154 by pivot pin 156 connected to brackets 157 and 158 secured to laterally spaced channel members 81.

Although not fully illustrated in FIGS. 2 and 3, it should be understood that a parallel linkage 60 is interconnected between each aligned set of channel members 81 and skid brackets 63.

OPERATION

It is particularly important for the cutter bar to closely follow the ground contour when harvesting low podding plants such as soybeans. The mounting arragement for the cutter bar 37 permits it to assume an end-to-end configuration similar to the contour of the field being harvested. The parallel linkages permit different lateral points of the cutter bar 37 be at different vertical positions and the use of a series of lateral spaced skids insures flexing of the cutter bar 37 along its length as the skids move up and down (and tilt) in following the field contour. The ball and socket joints securing the parallel linkage to the cutter bar skids permit the skids to change their angular relationship to each other.

In harvesting with a floating cutter bar, it is desirable to have a light cutter bar in wet conditions to keep the cutter bar from digging into the ground and a relatively heavy cutter bar in dry field conditions to provide a low cutting height and crush the plant stubble. The primary springs (sheet springs 111 and 112) and the secondary springs 104 in combination provide adequate counterbalancing forces throughout the vertical floating range of the cutter bar. The secondary spring force can be adjusted by turning nut 102 to change the counterbalance and hence change the down pressure exerted by the floating cutter bar assembly 36 on the ground. The use of front and rear overlapping sheet springs provides a better loading ramp contour for the harvester crop than prior single sheet springs spanning the fore and aft space between the cutter bar and the header bottom. The flatter profile provided by the double sheet spring arrangement of this invention reduces the likelihood of seeds being lost over the front of the cutter bar.

The embodiments of the invention in which an exclusive property or privilege is claimed are defined as follows:

1. In a crop harvester header having a transverse rear wall, a pair of upstanding end walls and a bottom structure extending between said end walls and to said rear wall, the combination comprising:

a flexible floating cutter bar extending transversely along the front of said bottom structure, a plurality of link supported ground engaging skids secured in supporting relation to said cutter bar at transversely spaced intervals therealong, at least one pair of fore and aft extending parallel links for each of said link supported skids, means pivotally connecting rear parts of said links to said bottom structure for predetermined vertical swinging movement about longitudinally spaced transverse axes between raised and lowered positions of said cutter bar, means pivotally connecting the front ends of each of said pair of links to the skid associated therewith, a lever arm on the rear of one of said links of each pair, a compression spring interposed between each of said lever arms and said header, a first series of sheet springs having their rear ends secured to the top of said bottom structure and disposed generally horizontally along the front end of the header; and a second series of generally horizontal sheet springs secured at their front ends to said cutter bar and extending rearwardly a substantial distance presenting rear ends in overlapping thrust transmitting engagement with the front ends of said first series of sheet springs, said sheet springs and compression springs complementally serving to at least partially support said cutter bar during the floating operation thereof permitted by said predetermined swinging movement of said links.

2. The header of claim 1 wherein said sheets exert greater lift to said cutter bar in said lowered position thereof than in said raised position thereof and wherein said compression springs exert greater lift to said cutter bar in said raised position thereof than in said lowered position thereof.

3. The header of claim 1 wherein said front ends of each of said pair of links are connected to said associated skid by a pair of longitudinally spaced ball and socket joints.

4. The header of claim 2 wherein said front ends of each of said pair of links are connected to said associated skid by a pair of longitudinally spaced ball and socket joints.

* * * * *